US012790883B2

(12) United States Patent
Gustavsson

(10) Patent No.: US 12,790,883 B2
(45) Date of Patent: Nov. 10, 2026

(54) UPPER CONSTRUCTION ELEMENT AND LOWER CONSTRUCTION ELEMENT FOR A CONTAINER AND A CONTAINER

(71) Applicant: CESIUM AB, Katrineholm (SE)

(72) Inventor: Jack Gustavsson, Katrineholm (SE)

(73) Assignee: CESIUM AB, Katrineholm (SE)

( * ) Notice: Subject to any disclaimer, the term of this patent is extended or adjusted under 35 U.S.C. 154(b) by 1436 days.

(21) Appl. No.: 17/419,339

(22) PCT Filed: Dec. 3, 2019

(86) PCT No.: PCT/SE2019/051224
§ 371 (c)(1),
(2) Date: Jun. 29, 2021

(87) PCT Pub. No.: WO2020/141992
PCT Pub. Date: Jul. 9, 2020

(65) Prior Publication Data
US 2021/0396067 A1 Dec. 23, 2021

(30) Foreign Application Priority Data
Jan. 4, 2019 (SE) .................................... 1930005-2

(51) Int. Cl.
*E05G 1/024* (2006.01)

(52) U.S. Cl.
CPC .................................... *E05G 1/024* (2013.01)

(58) Field of Classification Search
CPC .................................. E05G 1/02; E05G 1/024
See application file for complete search history.

(56) References Cited

U.S. PATENT DOCUMENTS

| | | | | |
|---|---|---|---|---|
| 1,815,187 A * | 7/1931 | Coles | E05G 1/024 428/614 |
| 1,888,042 A * | 11/1932 | Lynn | E05G 1/024 428/614 |
| 3,826,172 A * | 7/1974 | Dawson | F41H 5/0421 428/614 |
| 4,158,338 A | 6/1979 | Dippold et al. | |

(Continued)

FOREIGN PATENT DOCUMENTS

| | | |
|---|---|---|
| CH | 668801 A5 | 1/1989 |
| CN | 1918347 A | 2/2007 |

(Continued)

OTHER PUBLICATIONS

Chinese Official Action (Jul. 25, 2022) for corresponding Chinese App. 2019800087731.5.

(Continued)

*Primary Examiner* — Christopher J Boswell
(74) *Attorney, Agent, or Firm* — Muncy, Geissler, Olds & Lowe, P.C.

(57) ABSTRACT

The invention relates to a container and a lower and an upper construction element each including a first surface, and a second surface. The surfaces are arranged at a distance from one another, forming a space wherein at least one non-concrete composite bar and a metal component is arranged. Concrete is arranged in the space between the first surface, the second surface, and the composite bars.

24 Claims, 3 Drawing Sheets

(56) References Cited

U.S. PATENT DOCUMENTS

| | | | | | |
|---|---|---|---|---|---|
| 4,901,498 | A * | 2/1990 | Gerwick, Jr. | E04C 5/16 | 52/649.1 |
| 6,543,371 | B1 * | 4/2003 | Gardner | E04C 2/384 | 109/83 |
| 7,516,589 | B2 * | 4/2009 | Messiqua | E04B 2/8658 | 52/79.5 |
| 7,926,407 | B1 * | 4/2011 | Hallissy | F42D 5/05 | 89/36.02 |
| 8,424,473 | B1 * | 4/2013 | Mandall | F42D 5/045 | 109/82 |
| 8,555,794 | B2 * | 10/2013 | Tamura | G07F 9/0235 | 109/78 |
| 10,378,267 | B2 * | 8/2019 | Grant | B32B 5/024 | |
| 11,905,107 | B2 * | 2/2024 | Gustavsson | E05G 1/026 | |
| 2004/0185213 | A1 | 9/2004 | Skelton et al. | | |
| 2015/0275568 | A1 * | 10/2015 | Eng | E05G 1/024 | 428/221 |
| 2018/0051503 | A1 | 2/2018 | Alarcon | | |

FOREIGN PATENT DOCUMENTS

| | | | |
|---|---|---|---|
| CN | 201100063 | Y | 8/2008 |
| CN | 201381740 | Y | 1/2010 |
| CN | 103498617 | A | 1/2014 |
| CN | 107614812 | A | 1/2018 |
| DE | 496228 | C | 4/1930 |
| DE | 8618389 | U1 | 8/1986 |
| DE | 8500174 | U1 | 7/1989 |
| DE | 10051028 | A1 | 5/2002 |
| FR | 2539800 | A1 | 7/1984 |
| RU | 2427699 | C1 | 8/2011 |
| TW | 435569 | U | 5/2001 |
| WO | 2005069747 | A1 | 8/2005 |
| WO | 2013086638 | A1 | 6/2013 |
| WO | 2018099528 | A1 | 6/2018 |

OTHER PUBLICATIONS

European Search Report (Jul. 22, 2022) for corresponding European App. 19 906 746.3.

International Search Report (Feb. 25, 2020) for corresponding International App. PCT/SE2019/051224.

* cited by examiner

UPPER CONSTRUCTION ELEMENT AND LOWER CONSTRUCTION ELEMENT FOR A CONTAINER AND A CONTAINER

BACKGROUND AND SUMMARY

The present invention relates to construction elements for containers and specifically the upper element and the lower element of the container. The invention further relates to containers.

Safe or secure storage of articles, goods or property is important to protect valuable articles, to secure high value, to prevent access to unauthorized or unqualified persons, or for burglary protection. Further reasons to store content in a controlled environment could also include protecting the contents from damage during a flood, fire, or natural disaster.

For specific articles, such as weapons certain medical and/or chemical articles and explosives, access prevention is required by law in many locations/jurisdictions. Access prevention for certain articles could also be required for insurance purposes.

A safe is commonly used for storing the valuable articles, and the safety level of the safe is commonly tested by a certification company/organization such as UL, TÜV or RISE (formerly SP Sveriges Tekniska Forskningsinstitut in Sweden) in accordance with a specific standard, such as EN 1143-1. Commonly the safe or lock is graded with a certain protection level. A safe with a high protection grade requires a long time and much effort to force.

An example of a storage container arranged with a construction element is described in patent application WO2005/069747 A1. A drawback with currently existing solutions according to WO2005/069747 A1 is that the described construction element has a wide cross section, leading to thick walls with large amount of concrete that is thus leading to heavy containers.

Further problems which the present invention aims to solve will be elucidated below in the detailed description of the various embodiments.

It is desirable to provide a novel and improved construction, element for a container and specifically a safe container.

The invention relates, according to an aspect thereof, to a lower construction element for a container as mentioned in the introduction, where the lower construction element comprises a first surface, and a second surface, arranged at a distance from one another, forming a space where at least one non-concrete composite bar is arranged, and where a metal component is arranged that at least partly surround the composite bar, and where concrete is arranged in the space between the first wall, the second wall, the metal component and the composite bar.

According to further aspects of the improved lower construction element for a container, the construction element further comprises that;

the metal component at least partly surround three out of four surfaces of the non-concrete composite bar in the longitudinal direction of the composite bar.

several of the non-concrete composite bars are arranged with a separating distance between them.

the separating distance is between 200 mm to 300 mm.

the thickness of the construction element is in the range of 130 mm-170 mm.

the non-concrete composite is a composite comprising at least two of the components; a polymer, an organic material, and a metal.

the polymer is polyethylene, the organic material is wood fibre.

the metal is aluminium.

at least one of the first surface (10) and the second surface (20) is made of steel plate armour.

the concrete (40) comprises at least one additive selected from wood pellets, plastic pellets, and/or metal pellets.

The invention further relates, according to an aspect thereof, to an upper construction element for a container where the construction element comprises a first surface, and a second surface, arranged at a distance from one another, forming a space where at least one non-concrete composite bar is arranged perpendicularly to a metal component, and where the composite bar is arranged to pass through an opening arranged in the metal component, and where concrete is arranged in the space between the first wall, the second wall, the metal component and the composite bar.

According to further aspects of the improved upper construction element for a container, the construction element further comprises that;

several of the non-concrete composite bars are arranged with a separating distance between them.

the separating distance is between 200 mm to 300 mm.

the thickness of the construction element is in the range of 130 mm-170 mm.

the non-concrete composite is a composite comprising at least two of the components; a polymer, an organic material, and a metal.

the polymer is polyethylene.

the organic material is wood fibre.

the metal is aluminium.

the first surface and the second surface is made of steel plate armour the concrete comprises at least one additive selected from wood pellets, plastic pellets and/or metal pellets.

The invention further relates, according to an aspect thereof, to an improved container comprising at least one lower construction element and at least one upper construction element.

Advantages of aspects of the present invention includes that safety of containers is improved and that the wall thickness of the construction element is reduced which results in lower total weight of the construction element and thus the container.

BRIEF DESCRIPTION OF THE DRAWINGS

The invention will be described in greater detail below with reference to the attached figures, in which.

DETAILED DESCRIPTION

Figure 1:
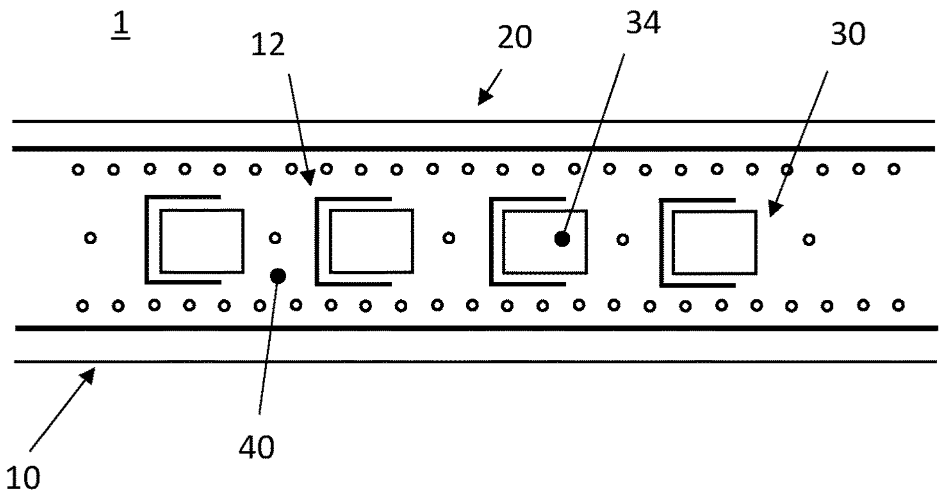
FIG. 1 shows a figure of a construction element, a lower element, according to one embodiment of the invention.

FIG. 1 shows a figure of a construction element 1 according to one embodiment of the invention. The construction element 1 is in particular a lower element of a container. Containers, also known as intermodal containers, are leans to bundle cargo and goods into larger, unitized loads, that can be easily handled, moved, and stacked, and that will pack tightly in a ship or yard. Intermodal containers are designed to function with different modes of transportation, so that the transported goods do not have to be reloaded during the transport. Such reloading would in itself pose a risk for theft, damage etc. of the goods.

Intermodal containers share a number of key construction features to withstand the stresses of intermodal shipping, to facilitate their handling and to allow stacking, as well as being identifiable through their individual, unique reporting mark according to ISO 6346.

Lengths of containers vary from 8 to 56 feet (2.4 m to 17.1 m). Most commonly used containers are twenty (6.1 m) or forty (12.2 m) foot standard length boxes of general purpose or "dry freight" design. These typical containers are rectangular, closed box models, with doors fitted at one end, and made of corrugated weathering steel (commonly known as corten) with a plywood floor. Corrugating the sheet metal used for the sides and roof contributes significantly to the container's rigidity and stacking strength.

Standard containers are 8-foot (2.44 m) wide by 8-foot and 6 inches (2.59 m) high or the taller "High Cube" "hi-cube" units measuring 9 feet 6 inches (2.90 m).

ISO containers have castings with openings for twistlock fasteners at each of the eight corners, to allow gripping the box from above, below, or the side, and they can be stacked up to ten units high. Regional intermodal containers, such as European and U.S. domestic units however, are mainly transported by road and rail, and can frequently only be stacked up to three laden units high.

Container capacity is often expressed in twenty-foot equivalent units (TEU, or sometimes teu).

As seen in FIG. 1, a lower construction element 1 comprises a first surface element 10 and a second surface element 20. The surface elements 10, 20 are preferably made of steel, commonly the surface elements of containers are made of corrugated steel. The reason corrugated steel is used is mainly to increase the rigidity of the container and thus allow stacking of containers.

In a container utilizing the described lower construction element 1 there is no specific need to utilize corrugated surface since the rigidity of the containers is increased by the described lower construction element 1. Corrugated surface elements could nevertheless be used in the described construction element 1 to further increase rigidity, or so that a container manufactured with the described lower construction element 1 gives the visual impression to be an ordinary container.

Commonly the material used in the surface elements 10, 20 is corten steel or some other material with an increased resistance to corrosion compared to ordinary steel. The surface elements 10, 20 could also be armoured steel to further increase the resistance of the lower construction elements 1 to external forces.

Armoured steel must be hard, yet resistant to shock, in order to resist high velocity metal projectiles. Steel with these characteristics is produced by processing cast steel billets of appropriate size and then rolling them into plates of required thickness. Hot rolling homogenizes the grain structure of the steel, removing imperfections which would reduce the strength of the steel. Rolling also elongates the grain structure in the steel to form long lines, which distribute stress loaded onto the steel throughout the metal, avoiding a concentration of stress in one area. This type of steel is called rolled homogeneous armour or RHA. RHA is homogeneous because its structure and composition is uniform throughout its thickness. The opposite of homogeneous steel plate is cemented or face-hardened steel plate, where the face of the steel is composed differently from the substrate. The face of the steel, which starts as an RHA plate, is hardened by a heat-treatment process.

A number of non-concrete, composite bars 30 are arranged side by side in the lower construction element 1 between the surface elements 10, 20. The composite bars 30 are, in the preferred embodiment generally flat, with a rectangular cross-section. Hence they have two larger surfaces 32 and two narrow side surfaces 34. In the preferred embodiment shown in FIG. 1, the bars 30 extend in an approximately vertical direction. The bars 30 are also preferably arranged with their larger surfaces 32 facing the inside surfaces of the wall elements 10, 20, in particular approximately parallel with the inside surfaces. The non-concrete composite bar is at least partly surrounded by a metal component 12. Preferable the metal component 12 is a C-beam structural channel also known as parallel flange channel. The bar 30 is preferably arranged in the void formed by the metal component 12 so that three out of four sides of the bar 30 in the longitudinal direction is at least partly covered by the metal component 12. The metal component 12 could be made of sheet metal and is preferably 3 mm thick but could vary between 2 mm to 8 mm thick. Rebar 22, 24 or reinforcing bars of at least two different diameters are arranged the concrete 40. The first rebar 22 is preferably of 8 mm diameter and a second rebar 24 is preferably of 16 mm diameter. Preferably the rebar 22, 24 are arranged to hold the metal component 12 and the bar 30 in the right place. The rebar 22, 24 are also arranged to form a net like structure conventionally used when casting reinforced concrete.

Figure 2:
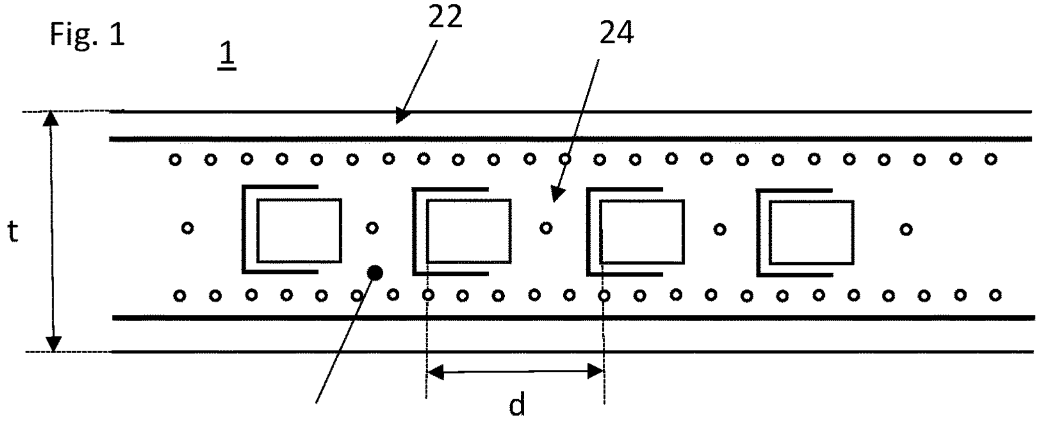
FIG. 2 shows a figure of a construction element, a lower element, according to one embodiment of the invention.

FIG. 2 shows a figure of a lower construction element 1 according to one embodiment of the invention. The non-concrete composite bars 30 are preferably separated with a distance d of 200 mm to 300 mm and preferably arranged with equal distance to the first wall element 10 and the second wall element 20. The thickness t of the lower construction element 1 is in the range of 130 mm-170 mm.

Figure 3:
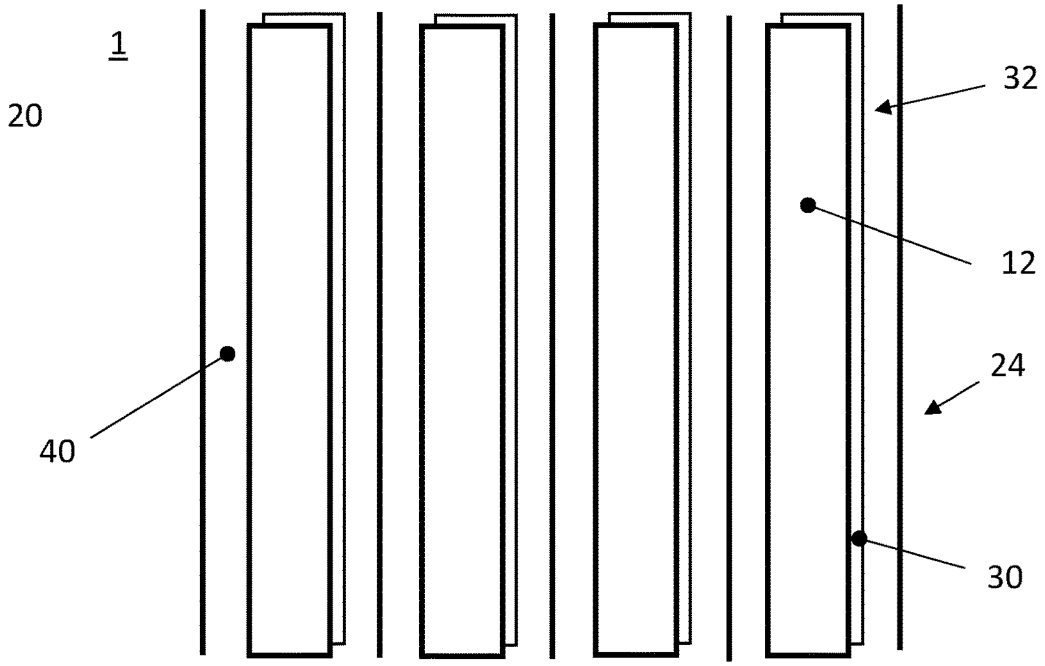
FIG. 3 shows a figure of a construction element, a lower element, in a view from above according to one embodiment of the invention.

FIG. 3 shows the lower construction element 1 in a view from above in an embodiment with four non-concrete composite bars 30.

The lower construction element 1 is filled with concrete, i.e. a composite of at least cement and construction aggregate. Construction aggregate is a broad category of coarse to medium grained particulate material used in construction, including sand, gravel, crushed stone, slag, recycled concrete and/or geosynthetic aggregates. Aggregates are a component of composite materials such as concrete and asphalt concrete; the aggregate serves as reinforcement to add strength to the overall composite material. As an option, the concrete may also comprise a concrete additive, selected from wood pellets, plastic pellets, and/or metal pellets. Concrete additives with a low density serve to reduce the total weight of the lower construction element 1. Concrete additives with a high density will increase the total weight, but are an option for providing the concrete with desirable properties, such as an increased resistance to cutting.

The bars 30 are non-concrete, i.e. not made from a composite of cement and construction aggregate. The non-concrete composite material is preferably a composite, preferably a bio-composite, comprising plastic, wood fibre and an additive. An alternative plastic could be polyethylene. The additive is preferably a metal, such as aluminium. A commercial example of a bio-composite is DuraSense™ but other alternatives of composites or bio-composites are also possible to use. The wood fibre content of the non-concrete composite could be in the range of 10%-60%. Bio-composite is a composite material formed by a matrix (resin) and a reinforcement of natural fibres. Bio-composites often mimic the structure of the living materials involved in the process keeping the strengthening properties of the matrix that was used, but always providing biocompatibility. The matrix phase is formed by polymers derived from renewable and non-renewable sources.

The matrix is important to protect the fibres from environmental degradation and mechanical damage, to hold the fibres together and to transfer the loads on it. In addition, bio-fibres are the principal components of bio-composites which are derived from biological origins, for example fibres from crops (cotton, flax or hemp), recycled wood, waste paper, crop processing by products or regenerated cellulose fibre (viscose/rayon). Benefits of bio-composites are that they are renewable, cheap, recyclable, and biodegradable. Bio-composites can be used alone, or as a complement to standard materials, such as carbon fibre, Bio-composites have lower density compared to wood.

The lower construction element 1 comprises at least five elements, two steel surfaces 10, 20, concrete 40, metal component 12, and the non-concrete composite bars 30. In case there is an intention to force or break through the lower construction element 1, the first surface element 10 is the first surface that has to be forced. To penetrate the steel surface 10, a gas burner or blowtorch or other heat generating means could be used. When the first surface element 10 is penetrated the next step would be to penetrate the concrete 40. Concrete is preferably penetrated by drilling and/or sawing or some other cutting operation.

By adequate selection of the material of the metal component and the non-concrete composite such as to inhibit the cutting operation, the time needed to penetrate the concrete metal/non-concrete combination of the lower construction element 1 is prolonged. When the concrete/metal/non-concrete composite combination has been penetrated, the second surface 20 has to be penetrated and heat generating means needs to be used once again.

In one embodiment a first side surface and a second side surface, not shown in the figures, are arranged at the lateral ends of the first surface 10 and the second surface 20, to form a mould or die formed space in which the metal component 12 and the non-concrete composite bars 30 are arranged together with rebar 22, 24 or reinforcing bars. The rebar 22, 24 is preferably arranged to hold the metal component 12 and the non-composite bars 30 in the intended places before pouring of the concrete 40. The concrete is poured into the void space made up of the surface elements and the metal components 12 and the non-concrete composite bars 30.

The general idea of the construction element is hence making penetration thereof as complicated, and as time-consuming, as possible. Thereby there is an increased risk of discovery of an attempt of forced entry before it has been completed. The different materials in the construction element require different means for the penetration thereof. The heat generating means required to penetrate the outer first and second walls 10, 20 are inefficient for penetration of the concrete 40.

The cutting means required for penetration of the concrete will be adversely affected by the metal component and the non-concrete composite material encountered when the metal components 12 and the bars 30 are reached.

Figure 4:
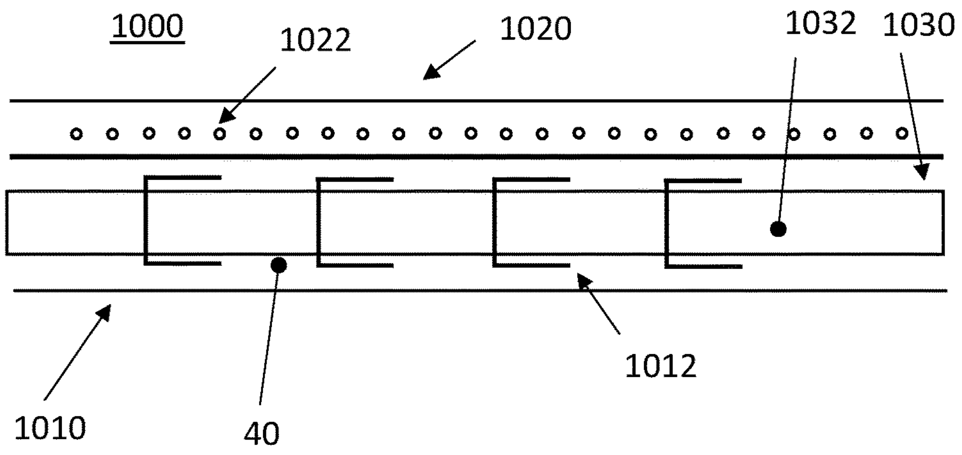
FIG. 4 shows a figure of a construction element, an upper element, according to one embodiment of the invention.

FIG. 4 shows a figure of an upper construction, element 1000 according to one embodiment of the invention. The upper construction element 1000 is in particular an upper element of a container.

As seen in FIG. 1, an upper construction element 1000 comprises a first surface element 1010 and a second surface element 1020. The surface elements 1010, 1020 are preferably made of steel, commonly the surface elements of containers are made of corrugated steel. The reason corrugated steel is used is mainly to increase the rigidity of the container and thus allow stacking of containers.

In a container utilizing the described construction element 1000 there is no specific need to utilize corrugated surface since the rigidity of the containers is increased by the described upper construction element 1000. Corrugated surface elements could nevertheless be used in the described construction element 1000 to further increase rigidity, or so that a container manufactured with the described upper construction element 1000 gives the visual impression to be an ordinary container.

Commonly the material used in the surface elements 1010, 1020 is corten steel or some other material with an increased resistance to corrosion compared to ordinary steel. The surface elements 1010, 1020 could also be armoured steel to further increase the resistance of the upper construction elements 1000 to external forces.

A number of non-concrete, composite bars 1030 are arranged side h side in the upper construction element 1000 between the surface elements 1010, 1020. The composite bars 1030 are, in the preferred embodiment generally flat, with a rectangular cross-section. Hence they have two larger surfaces 1032 and two narrow side surfaces 1034. In the preferred embodiment shown in FIG. 4, the bars 1030 extend in an approximately vertical direction. The bars 1030 are also preferably arranged with their larger surfaces 1032 facing the inside surfaces of the surface elements 1010, 1020, in particular approximately parallel with the inside surfaces. The non-concrete composite bars 1030 are at least partly surrounded by a metal component 1012. Preferable the metal component 1012 is a C-beam structural channel also known as parallel flange channel. The metal component 1012 could be made of sheet metal and is preferably 3 mm thick but could vary between 2 mm to 8 mm thick. The bar 1030 is preferably arranged in an opening arranged in the metal component 1012 and is preferably perpendicularly arranged in relation to the metal component 1012. By perpendicularly, also known as orthogonally, the orientation between the bar 1030 and the metal component 1012 includes that the angle between the bar 1030 and the metal component 1012 vary between 85 degree to 95 degree but is preferably as close to 90 degree as possible. The bar 1030 is thus oriented with approximately a 90 degree rotation compared to the metal component 1012 forming a net-like structure in a plane. The net-like structure is arranged between the surface elements 1010 and 1020. The bar 1030 passes through the metal component 1012 so that at least two sides of the bar 1030, in the longitudinal direction, is at least partly covered by the metal component 1012.

Rebar 1022, 1024 or reinforcing bars of at least two different diameters are arranged in the concrete 1040. A first rebar 1022 is preferably of 8 mm diameter and a second rebar 1024 is preferably of 16 mm diameter. Preferably the rebar 1022, 1024 are arranged to hold the metal component 1012 and the bar 1030 in the right place. The rebar 1022, 1024 are also arranged to form a net like structure conventionally used when casting reinforced concrete.

Figure 5:
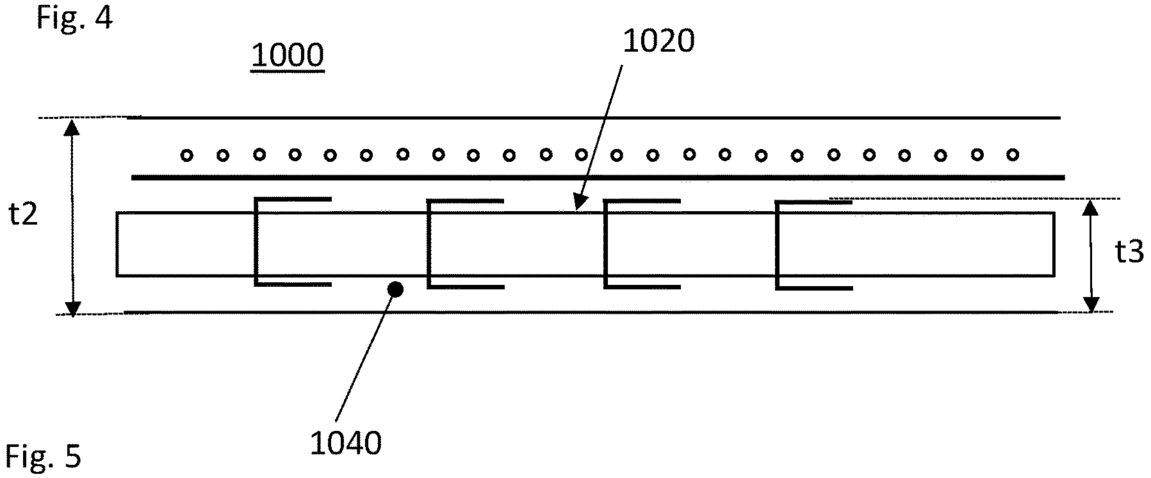
FIG. 5 shows a figure of a construction element, an upper element, according to one embodiment of the invention.

FIG. 5 shows a figure of an upper construction element 1000 according to one embodiment of the invention. The thickness t2 of the construction element 1 is in the range of 130 mm-170 mm. The non-concrete composite bars 1030 are preferably arranged so that the distance between the first surface element 1010 and the upper surface, in relation to the bar 1030, of the metal component 1012, t3, is in the range of 90 mm-130 mm.

Figure 6:
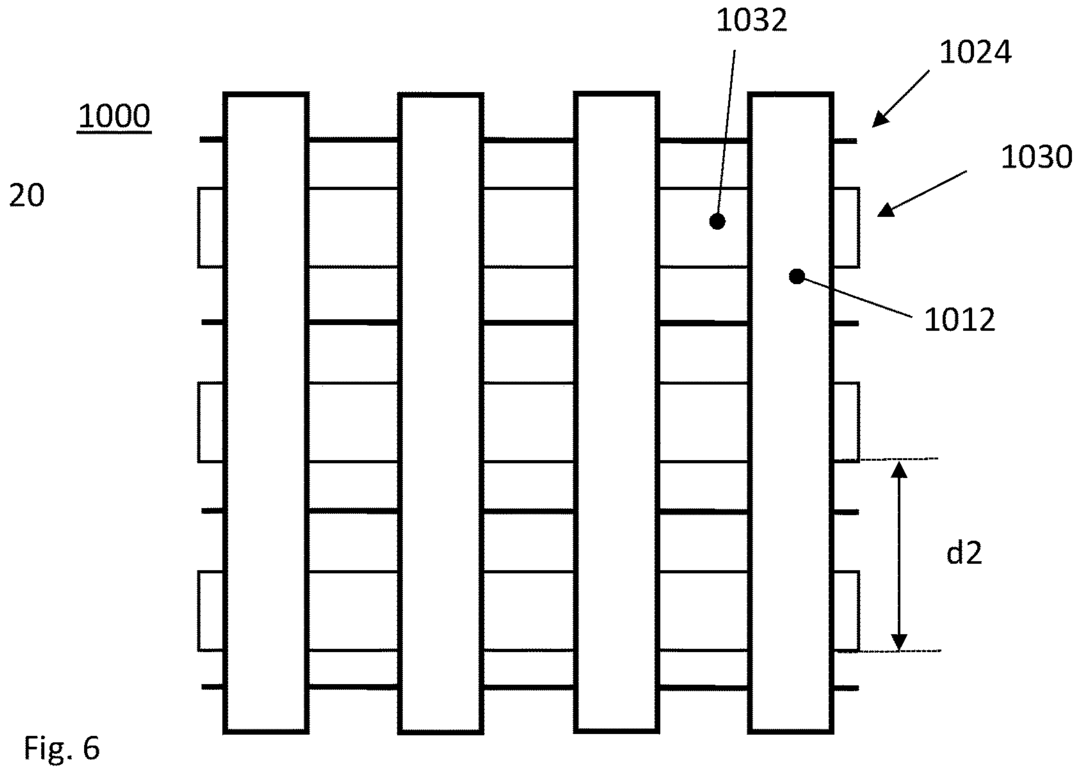
FIG. 6 shows a figure of a construction element, an upper element, in a view from above according to one embodiment of the invention.

FIG. 6 shows the upper construction element 1000 in a view from above in an embodiment with four non-concrete composite bars 1030. The non-concrete composite bars 1030 are preferably separated with a distance d2 of 200 mm to 300 mm and preferably arranged so that composite bar 1030 is not arranged with equal distance between the first surface element 1010 and the second surface element 1020. The upper construction element 1000 is filled with concrete 40. The bars 1030 are non-concrete, i.e. not made from a composite of cement and construction aggregate and of the same material as described above for the non-concrete composite bar 30.

The upper construction element 1000 comprises at least five elements, two steel surfaces 1010, 1020, concrete 40, metal component 1012, and the non-concrete composite bars 1030. In case there is an intention to force or break through the upper construction element 1000, the first surface element 1010 is the first surface that has to be forced. To penetrate the steel surface 1010, a gas burner or blowtorch or other heat generating means could be used. When the first surface element 1010 is penetrated the next step would be to penetrate the concrete 40. Concrete is preferably penetrated by drilling and/or sawing or some other cutting operation.

By adequate selection of the material of the metal component and the non-concrete composite such as to inhibit the cutting operation, the time needed to penetrate the concrete/metal/non-concrete combination of the upper construction element 1000 is prolonged. When the concrete/metal/non-concrete composite combination has been penetrated, the second surface 1020 has to be penetrated and heat generating means needs to be used once again.

In one embodiment a first side surface and a second side surface, not shown in the figures, are arranged at the lateral ends of the first surface 1010 and the second surface 1020, to form a mould or die formed space in which the metal component 1012 and the non-concrete composite bars 1030 are arranged together with rebar 1022, 1024 or reinforcing bars. The rebar 1022, 1024 is preferably arranged to hold the metal component 1012 and the non-composite bars 1030 in the intended places before pouring of the concrete 40. The concrete is poured into the void space made up of the surface elements and the metal components 1012 and the non-concrete composite bars 1030.

The general idea of the construction element is hence making penetration thereof as complicated, and as time-consuming, as possible. Thereby there is an increased risk of discovery of an attempt of forced entry before it has been completed. The different materials in the construction element require different means for the penetration thereof. The heat generating means required to penetrate the outer first and second walls 1010, 1020 are inefficient for penetration of the concrete 40.

The cutting means required for penetration of the concrete will be adversely affected by the metal component and the non-concrete composite material encountered when the metal components 1012 and the bars 1030 are reached.

Figure 7:
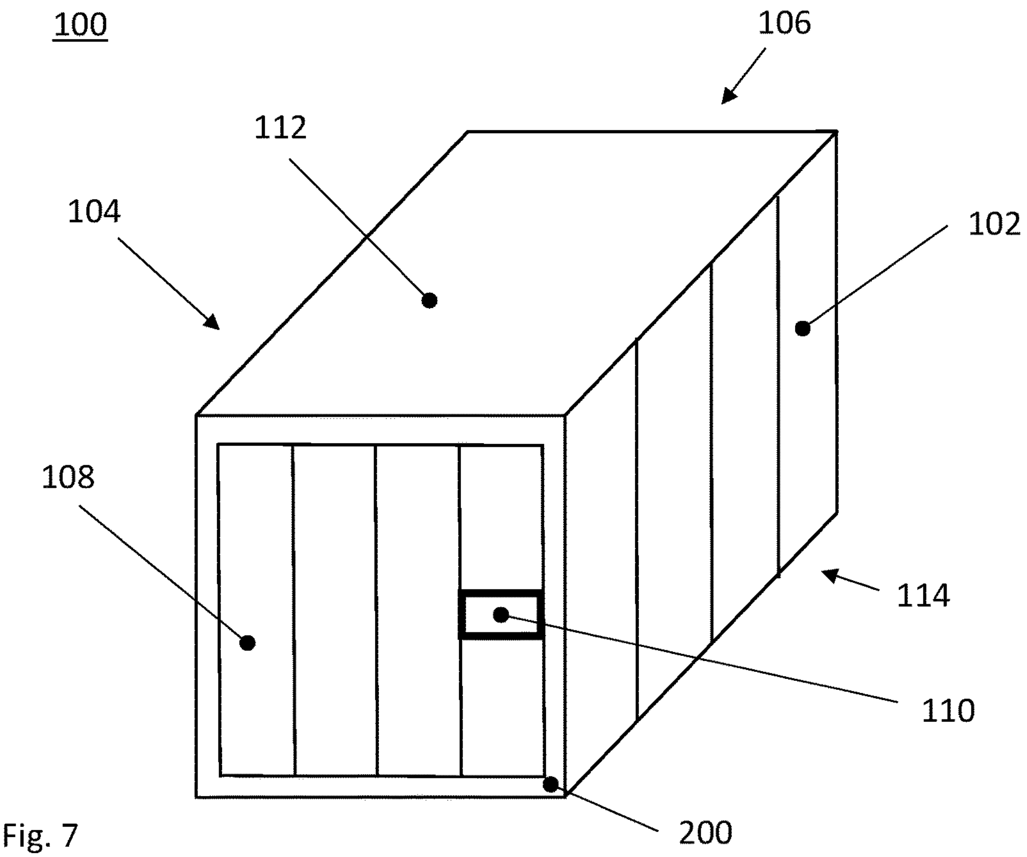
FIG. 7 shows a figure of a container according to one embodiment of the invention.

FIG. 7 shows a container 100. A container 100 in a typical embodiment has an upper element, a lower element and four wall elements and at least one door. In traditional transport containers, the doors are commonly a two part construction arranged at one of the side walls. In a security container a single door is preferable. The container shown in FIG. 7 comprises a first wall element 102, a second wall element 104, and a third wall element 106. The container further comprises a door element 108 arranged in a frame 200 holding the door element 108. The door element 108 is preferable arranged with a lock, not shown in FIG. 7, arranged behind a lock protector shield 110. The container 100 further comprises an upper element 112 and a lower element 114.

Figure 8:
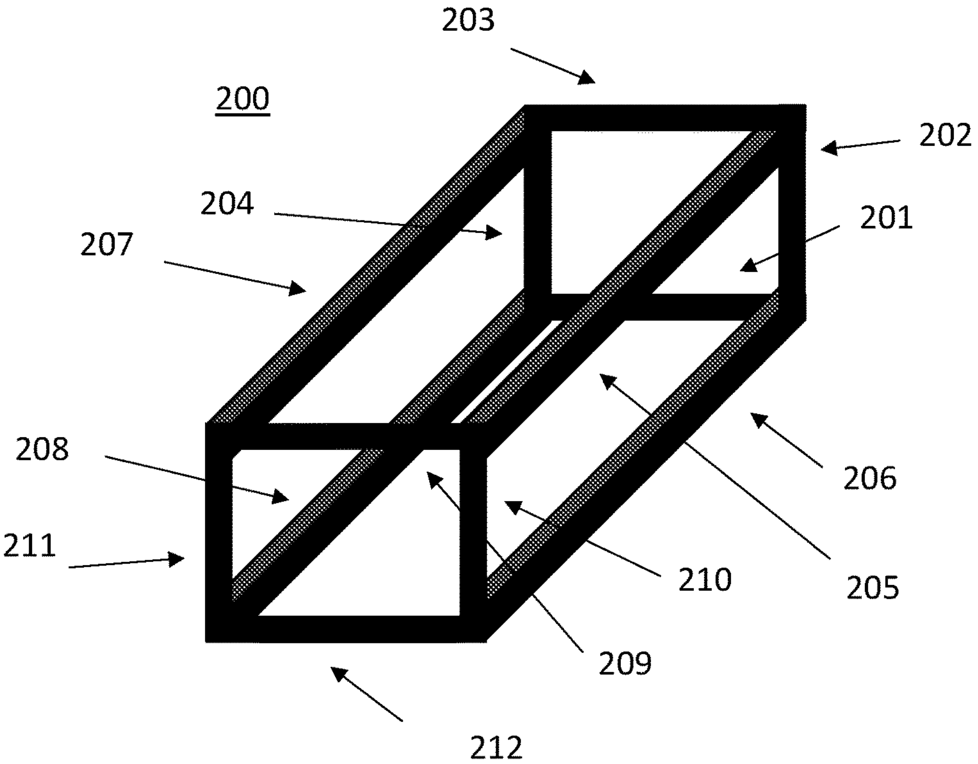
FIG. 8 shows the frame for a container according to one embodiment of the invention.

FIG. 8 shows the frame 200 for a container. The frame has a shape where bars extend along the edges of an imagined cuboid, and it is preferably be made of steel, concrete or some other material with sufficient strength. The frame 200 is preferably made of twelve bars 201, 202, 203, 204, 205, 206, 207, 208, 209, 210, 211, 212 arranged to form a frame 200. In a container 100 a number of construction elements 1, 1000 are arranged, preferably an upper element 112, a lower element 114 and three wall elements 102, 104, 106 and at least one door element 108, to a frame 200. The construction elements 1, 1000 are secured to the frame 200 by fastening means such as bolts, rivets or other fastening means. Holding means for the door element 108 are hinges arranged to the frame 200. The hinges are not visible in the drawings, but they are of any form known to the skilled person, preferably provided with means for preventing the door element 108 from being lifted off of the hinges.

The invention is not limited to the embodiments specifically shown, but can be varied in different ways within the scope of the patent claims.

It will be appreciated, for example, that the size, material and how the components of the construction element are arranged, as well as the integral elements and component parts, is adapted to the needs of the user and/or customer of the construction element, and other current design characteristics.

The invention claimed is:

1. A lower construction element wherein the lower construction element comprises a first surface, and a second surface, arranged at a distance from one another, forming a space where a non-concrete composite bar is arranged, and where a metal component is arranged that at least partly surround the non-concrete composite bar, and where concrete is arranged in the space between the first surface, the second surface, the metal component and the non-concrete composite bar.

2. The lower construction element according to claim 1, wherein the metal component at least partly surrounds only three out of four surfaces of the non-concrete composite bar in a longitudinal direction of the non-concrete composite bar and wherein the four surfaces of the non-concrete composite bar are exposed to the concrete.

3. The lower construction element according to claim 1 wherein several non-concrete composite bars are arranged with a separating distance between them.

4. The lower construction element according to claim 3 wherein the separating distance is between 200 mm to 300 mm.

5. The lower construction element according to claim 1 wherein a thickness of the lower construction element is in a range of 130 mm-170 mm.

6. The lower construction element according to claim 1 wherein the non-concrete composite bar is a composite comprising at least two of a polymer, an organic material, or a metal.

7. The lower construction element according to claim 6 wherein the polymer is polyethylene.

8. The lower construction element according to claim 6 wherein the organic material is wood fiber.

9. The lower construction element according to claim 6 wherein the metal is aluminum.

10. The lower construction element according to claim 1 wherein at least one of the first surface and the second surface is made of steel plate armor.

11. The lower construction element according to claim 1 wherein the concrete comprises at least one additive selected from wood pellets, plastic pellets, and/or metal pellets.

12. A container comprising at least one lower construction element according to claim 1 and an upper construction element, the upper construction element comprising an upper construction element first surface, and an upper construction element second surface, arranged at an upper construction element distance from one another, forming an upper construction element space where an upper construction element non-concrete composite bar is arranged perpendicularly to an upper construction element metal component, and where the upper construction element non-concrete composite bar is arranged to pass through an upper construction element opening arranged in the upper construction element metal component, and where concrete is arranged in the upper construction element space between the upper construction element first surface, the upper construction element second surface, the upper construction element metal component and the upper construction element non-concrete composite bar.

13. The lower construction element according to claim 1, wherein the non-concrete composite bar is a discrete elongate bar having a rectangular cross-section with a first larger surface, a second larger surface, a first narrow side surface, and a second narrow side surface, wherein the first larger surface is parallel with an inside surface of the first surface and the second larger surface is parallel with an inside of the second surface, wherein the metal component is a structural channel within which the non-concrete composite bar is disposed, and wherein the concrete extends into a space between the structural channel and the non-concrete composite bar.

14. The lower construction element according to claim 1, wherein the non-concrete composite bar comprises a polymer matrix reinforced with an organic material and a metallic additive.

15. An upper construction element wherein the upper construction element comprises a first surface, and a second surface, arranged at a distance from one another, forming a space where a non-concrete composite bar is arranged perpendicularly to a metal component, and where the non-concrete composite bar is arranged to pass through an opening arranged in the metal component, and where concrete is arranged in the space between the first surface, the second surface, the metal component and the non-concrete composite bar.

16. The upper construction element according to claim 15 wherein several of non-concrete composite bars are arranged with a separating distance between them.

17. The upper construction element according to claim 16 wherein the separating distance is between 200 mm to 300 mm.

18. The upper construction element according to claim 15 wherein a thickness of the upper construction element is in a range of 130 mm-170 mm.

19. The upper construction element according to claim 15 wherein the non-concrete composite bar is a composite comprising at least two of a polymer, an organic material, or a metal.

20. The upper construction element according to claim 19 wherein the polymer is polyethylene.

21. The upper construction element according to claim 19 wherein the organic material is wood fiber.

22. The upper construction element according to claim 19 wherein the metal is aluminum.

23. The upper construction element according to claim 15 wherein at least one of the first surface and the second surface is made of steel plate armor.

24. The upper construction element according to claim 15 wherein the concrete comprises at least one additive selected from wood pellets, plastic pellets, and/or metal pellets.

* * * * *